Patented Aug. 19, 1941

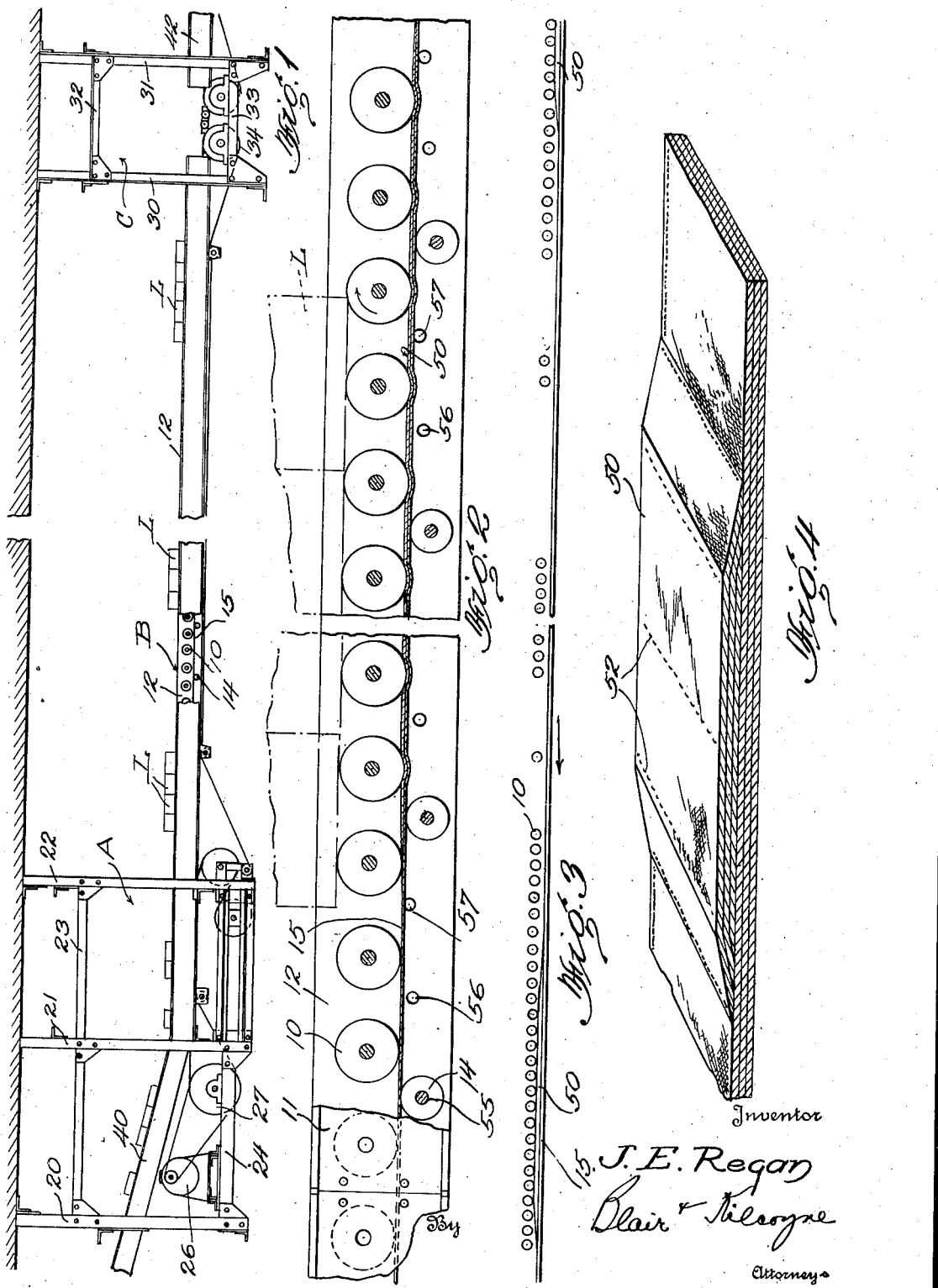

2,253,198

UNITED STATES PATENT OFFICE 2,253,198

CONVEYER

John Emmet Regan, Syracuse, N. Y., assignor to The Lamson Company, Incorporated, Syracuse, N. Y., a corporation of Massachusetts Application February 9, 1940, Serial No. 318,156

23 Claims. (Cl. 198—127)

This invention relates to improvements in conveyers, and while not limited thereto, has particular application to storage or semi-storage type conveyers, on which loads of commodities supplied thereto generally at a non-uniform rate may accumulate throughout the full length thereof, thus to provide a storage line of commodities from which the commodities may be removed as desired.

Usually, storage conveyers are of the gravity roller type employing free running rollers on which loads are supported as they advance by gravity towards the discharge end of the conveyer which is generally blocked, thus to cause an accumulation of the loads along the length of the conveyer. When accumulated loads of commodities such as cartons remain in storage on the rollers of such a conveyer for any substantial period of time, the cartons tend to bed or lodge themselves on the rollers and consequently must be manually pushed forward or otherwise dislodged from the rollers on which they have bedded when the loads are to be advanced.

In certain installations, use has been made of the so-called semi-storage conveyer of the type employing live rollers which hereto have been driven by a plain surfaced driving belt of conventional construction. The purpose of such a conveyer is to provide a line or a plurality of lines of conveyers on which loads may accumulate and which may be emptied as desired. Where the accumulated load of commodities is heavy, the load friction is, of course, high and a large-size and expensive power unit is required to drive the driving belt as aforesaid.

Accordingly, the present invention contemplates and has for one of its objects the provision of a novel live roll conveyer for use either as a storage or semi-storage conveyer unit on which the loads may accumulate throughout the full length thereof, and in which the live rollers may be driven by a small-size and relatively inexpensive power unit; the provision of a live roll storage or semi-storage conveyer unit as aforesaid on which the accumulated loads are maintained in an effectively non-static condition; the provision of a live roll storage or semi-storage conveyer unit for loads of the character tending by their own weight to bed themselves on the rollers, and which operates in an automatic manner to dislodge such of the loads as have bedded on the rollers; the provision of a live roll conveyer employing roller driving means capable of maintaining the loads in movement and/or non-static condition while reducing the load friction to a minimum; the provision of a novel and inexpensive driving means for live roll conveyers which reduces the load friction to a minimum and which can be operated by a relatively small power unit and at the expenditure of a relatively small amount of power; and the provision of a roller drive means as aforesaid which is simple and inexpensive in construction, which is rugged and durable in use, and which is highly effective in its operation.

Other objects will be in part obvious and in part hereinafter pointed out in connection with the following analysis of this invention wherein is illustrated an embodiment of the invention in detail.

In the drawing—

Fig. 1 is a side elevation of a typical storage or semi-storage conveyer unit in accordance with the present invention;

Fig. 2 is an enlarged detail of a portion of an intermediate section of the conveyer unit illustrated in Fig. 1;

Fig. 3 is illustrative of the wave or ripple drive of the conveyer rollers as provided by the driving means of the present invention; and Fig. 4 is a perspective taken through a length of the drive belt and a drive pad thereof, as illustrated in Fig. 3.

Referring to the drawing, the conveyer unit forming the subject-matter of the present invention may, with the exception of the roller drive means, follow generally the conventional design of a live roller conveyer employing an upper longitudinal series of spaced load supporting rollers which extend transversely between side frame channels in which the rollers are journalled for rotation, a lower longitudinal series of pressure rollers also extending between side channels as aforesaid, and which are staggered with relation to the load-supporting rollers, and a drive belt having a longitudinal run extending between the upper and lower series of rollers, the belt being maintained in frictional driving contact with the upper rollers, by the pressure rollers, thereby to effectively drive the upper rollers. Such an arrangement is diagrammatically illustrated in Figs. 1 and 2, wherein the driven or live rollers 10 are mounted for rotation between the spaced channels 11, 12, the lower pressure rollers 14 being similarly mounted. Between the rollers 10 and 14 extends an upper horizontal flight or run of a drive belt 15, adapted to be maintained in frictional driving contact with the rollers 10 by the pressure rollers 14.

The conveyer unit as shown may be constituted by a combined drive and take-up section A, an intermediate section B of length determined by the requirements of a particular installation, it being understood that the intermediate section may be made up of a plurality of sub-sections, and a foot-end section generally designated C.

The drive and take-up section A which is preferably fabricated as a sub-assembly unit, is shown to include side frames, each formed by three spaced uprights 20, 21, 22, an upper side angle 23, a lower side angle 24 extending between uprights 20, 21, and a trackway generally indicated at 25 extending between uprights 21, 22, and which forms a part of the take-up mechanism only generally illustrated. The side frames are provided with suitable cross braces as shown. Arranged between uprights 20, 21 and supported on the bottom angles 24 of the side frames is a power unit for the drive belt such as a motor 26 having a belt and pulley or equivalent drive connection with the driving roller or drum 27 over which the belt is wrapped. One end of the intermediate section B is adapted to extend into the space between side frames of the drive and take-up section A, being supported thereon in conventional manner.

The foot end section C, also preferably fabricated as a sub-assembly unit, may include side frames each formed by uprights 30, 31, and upper and lower side angles 32, 33, respectively, in the lower of which is journaled the foot end idler drum or roller 34 for the drive belt. The frame of the foot end section C provides a support for the other or right end of the intermediate section B of the conveyer unit.

In order to conserve plant floor space, storage or semi-storage conveyers of the character under consideration are generally mounted from the ceiling, and in the unit illustrated, the frame uprights are extended upwardly and secured at their upper ends to the ceiling, the intermediate section B being supported at intervals by suitable hangers or ceiling brackets, not shown. However, to meet the requirements of a particular installation, the conveyer unit as described may be floor-supported, in which event the frame uprights are extended downwardly to engage the floor on which the unit operates.

As shown, loads of commodities are fed to the rollers 10 by suitable means such as an inclined gravity roll conveyer generally indicated at 40, the lower end of which extends between the side frames of the drive and take-up section A, being suitably supported therebetween. Other means for feeding loads to the storage conveyer may be employed, such as chutes. Generally speaking, the loads are fed to the storage conveyer at a non-uniform rate, as for example, where the loads are in the nature of cartons coming from a sealing machine.

The frames of the foot end section C may also provide a support for a positive load take-away means 42; such as a conventional belt conveyer, or a live roll conveyer of the character in which all rollers are continuously driven. The positive take-away means may deliver the cartons accumulating on the storage conveyer to cars for shipment.

In Fig. 2 there is illustrated diagrammatically the operation of a live roller storage conveyer, in which the live or driven rollers 10 are adapted to be rotated in clockwise direction by the upper flight of the endless drive belt which extends between the live rollers and the lower pressure rollers 14 and moves from right to left. The loads supported on the live rollers are in the nature of filled cartons generally indicated at L. Clockwise rotation of live rollers 10 advances the loads to the right, and in a storage type conveyer the loads L may accumulate throughout the entire length of the roller series.

As distinguished from known conveyer constructions in which the live rollers are each continuously rotated by a plain-faced belt which contacts all of the live rollers of the series, the present invention contemplates and provides roller driving means such as a belt which is in driving contact with only a relatively small number or group of the load supporting rollers at one time, the rollers behind and in advance of such rollers as are being driven at any given instant being permitted to idle and thus turning only with the loads. While the improved driving belt of the present invention may be so constructed or arranged as to maintain driving contact with the same group (or a plurality of such groups) of load supporting rollers as the belt moves throughout its endless path of movement, in its preferred form the belt of the present invention is designed to progressively establish driving contact with the rollers of the entire series in the manner of a wave or ripple of driving contact which progresses along the length of the roller series.

Referring to Figs. 3 and 4, wherein a ripple belt in accordance with the present invention is illustrated, the belt proper is shown as fabricated from three plies of a suitable material such as canvas, the plies being stitched together and preferably treated for wear in known manner.

Secured to the relatively upper face of the belt and at spaced intervals along the length thereof, are a plurality of driving pads generally indicated at 50, Fig. 4, each of which is shown as made up of three plies of material, preferably of the same character as the belt proper. The three plies forming each driving pad preferably extend the full width of the belt, their longitudinal edges being selvaged and the selvaged edges of the relatively upper plies overlapping the like edges of the under plies. The pad plies may be secured to each other and to the belt proper by lines of stitching 52, although other forms of securement may be employed.

By the provision of the spaced driving pads 50 arranged at suitable intervals along the length of the driving run of the belt, as aforesaid, each pad has driving contact with a relatively small number only of the rollers 10, the rollers behind and in advance of the rollers then in contact with a pad being permitted to idle.

As belt 15 is driven throughout its endless path of movement, the pads 50 partake of such movement and impart a progressive wave or ripple of driving contact with the rollers of the series. Hence loads such as the cartons L supported on rollers 10 are intermittently advanced from left to right of the conveyer and may accumulate throughout the full length thereof. Assuming an accumulation of the loads, the intermittent drive of the load supporting rollers as provided by the ripple belt as aforesaid maintains the loads in non-static condition; that is to say, even with the right or discharge end of the unit blocked, the loads tend to move against the blocked end and in so doing, partake of some lateral or longitudinal shifting movement relative to the rollers on which they are supported. Accordingly, the tendency of the loads to bed on the rollers 10 is reduced to a minimum.

With the driving pads 50 contacting only a relatively limited number of the rollers 10 of the upper series at one time, the drive belt of the present invention results in a substantial reduction of the load friction, as compared with a plain surfaced driving belt of the character contacting all of the rollers of the series at one time. Hence the drive belt of the present invention permits the use of a smaller power unit with less horse power than is required to drive a plain surfaced belt, as will be apparent from the following calculations of horse power pertaining to the use of plain belt versus ripple belt.

It will be assumed that the rollers of a live roll conveyer 100 ft. long having a load thereon of 1,000 lbs., with the loads (boxes, cartons, etc.) accumulating the entire length of the roller series and brought to a stop by a blocked end, are driven by a plain belt moving at a rate of 30 ft. per minute, and having a constant load friction of 36% per ft. Under such conditions the total load friction would be (1000# × .36) or 360 lbs.

With a ripple belt of the present invention operating under the same conditions as above, and with the driving pads or ripples being approximately 5 ft. long and spaced every 40 ft., there results but 15 ft. of belt (pad) contact with the rollers and the load friction, assuming the load between ripples on idle rollers is 10 lbs., is (15 ft. × 10# × .36) or 54 lbs.

Translating the load friction of the two types of driving belts into terms of horse power required for driving the same, a plain belt under the conditions stated requires a driving motor of ⅓ horse power as against .05 horse power motor to drive the ripple belt of the present invention. This reduction in load friction, in terms of cost of power unit required and its operation, represents a saving which is noticeably important when considering a system of conveyer installation.

The provision of the ripple drive of the load supporting rollers is further advantageous in its ability to automatically dislodge loads which by their weight have a tendency to bed on the rollers when in storage thereon for a substantial period of time. With the storage conveyers or known constructions which employ gravity rollers, the loads must in some cases be manually moved forward from the rollers on which they have bedded to effect their dislodgement. With the ripple belt of the present invention this dislodgement, if required, is effected in automatic manner by the intermittent drive of certain rollers with reference to others of the series and the tendency of the ripple drive on blocked loads to effect lateral and longitudinal shifting of the loads then on the rollers being driven, as well as by the pushing effect of loads behind the bedded loads in dislodging the latter.

Under some conditions, and for certain types of loads, an adjustment of the pressure rollers 14 relative to the live rollers 10 is desirable, thus to vary the degree of driving contact of the belt pads 50 (amount of wrap) with reference to the live rollers.

One means of achieving this result is illustrated, and may comprise openings 55, 56, 57 at stepped levels in the side channels 11, 12 to receive the pressure roller spindles. Thus if a very light driving contact is desired, the pressure roller spindles are inserted in openings 55. If substantial contact is necessary, the pressure roll spindles are inserted into the higher level openings 56, and if very heavy contact is required, the spindles are inserted in the high level openings 57. It will be understood that other means for adjusting the axis of the pressure rolls, thus to vary contact pressure of the driving pads on the live rollers, may be employed.

While in the foregoing a roller driving means in the form of a flat belt having a plurality of driving pads spaced at intervals along its length has been illustrated and described, the invention is not limited to this particular arrangement. Obviously, where the character of the loads permit, driving means in the nature of a rubber-covered or surfaced cable having large diameter driving lengths and small diameter intermediate lengths could be utilized in place of the flat belt as described to effect the intermittent and/or ripple drive of the load supporting rollers. Similarly, the invention is not limited to a belt provided with the plurality of driving pads illustrated and described or, in the case of a driving cable, to the plurality of large diameter driving lengths, as the belt or cable may have a single driving pad or length which may extend, for example, half the entire length of the belt or cable, thus to provide a single driving ripple for each complete rotation of the driving means. Further, the particular ply construction of both the belt proper and the pad as referred to in the foregoing is to be regarded as typical only one form of flat belt construction by which the desirable objects of the invention may be accomplished, it being understood that this construction may be modified if and when necessary to meet the requirements of a particular installation or the character of particular loads being conveyed.

As many changes could be made in carrying out the above constructions without departing from the scope of the invention, it is intended that all matter contained in the above description or shown in the accompanying drawing shall be interpreted as illustrative and not in a limiting sense.

I claim:

1. A conveyer of the character described, comprising a longitudinal series of load-supporting rollers, means mounting said rollers for rotary movement, and means for imparting a succession of driving impulses to the rollers of the series.

2. A conveyer of the character described, comprising a longitudinal series of load-supporting rollers, means mounting said rollers for rotary movement, and means unitarily operable on a limited number only of the rollers of the series for imparting a succession of driving impulses to the rollers.

3. A conveyer of the character described, comprising a longitudinal series of load-supporting rollers, means mounting said rollers for rotary movement, and means for effecting a ripple drive of the rollers of the series.

4. A conveyer of the character described, comprising a longitudinal series of load-supporting rollers, means mounting said rollers for rotary movement, and means for imparting to the rollers of the series a driving impulse which advances along the roller series in the manner of a ripple.

5. A conveyer of the character described, comprising a longitudinal series of load-supporting rollers, means mounting said rollers for rotary movement, and means for imparting to the rollers of the series a succession of driving impulses which advance along the roller series in the manner of a succession of ripples.

6. A conveyer of the character described, comprising a longitudinal series of load-supporting rollers, means mounting said rollers for rotary movement, and means unitarily operable on a limited number only of the rollers of the series for imparting to the rollers a succession of driving impulses which advance along the roller series in the manner of a succession of ripples.

7. A conveyer of the character described comprising a longitudinal series of load supporting rollers, means mounting said rollers for rotary movement, and means advancing from end to end of the roller series for imparting a progression of driving impulses to said rollers.

8. A conveyer of the character described comprising a longitudinal series of load supporting rollers, means mounting said rollers for rotary movement, and means advancing from end to end of the roller series for imparting a succession of progressive driving impulses to said rollers whereby said rollers are driven intermittently.

9. A conveyer of the character described comprising a longitudinal series of load supporting rollers, means mounting said rollers for rotary movement, and means unitarily operable on a limited number only of the rollers of the series and movable from end to end of the series for imparting a succession of progressive driving impulses to said rollers whereby said rollers are driven intermittently.

10. A conveyer of the character described comprising a longitudinal series of load supporting rollers, means mounting said rollers for rotary movement, and a succession of means, each unitarily operative on a relatively small number only of the rollers of the series and movable from end to end of the roller series, for imparting intermittent rotary movement to said rollers.

11. A conveyer of the character described comprising a longitudinal series of load supporting rollers, means mounting said rollers for rotary movement, means having driving contact with a relatively small number only of the rollers of the series, and means for actuating said means from end to end of the series.

12. A conveyer of the character described comprising a longitudinal series of load supporting rollers, means mounting said rollers for rotary movement, a succession of means each having driving contact with a relatively small number only of the rollers of the series, and means for actuating the succession of means along the length of said series.

13. A conveyer of the character described comprising a longitudinal series of load supporting rollers, means mounting said rollers for rotary movement, a succession of means each having driving contact with a relatively small number only of the rollers of said series, a carrier for said means, and means for actuating said carrier in an endless path.

14. A conveyer of the character described comprising a longitudinal series of load supporting rollers, means mounting said rollers for rotary movement, a succession of means spaced substantially from each other and each having driving contact with a relatively small number only of the rollers of the series, an endless carrier for said means, and means for actuating said carrier.

15. A conveyer of the character described comprising a longitudinal series of load supporting rollers, means mounting said rollers for rotary movement, means having driving contact with a relatively small number only of the rollers of the series, means for adjusting the driving contact of said means with said rollers in accordance with load and load-conveying requirements, and means for actuating the second means from end to end of the series.

16. A conveyer of the character described comprising a longitudinal series of load supporting rollers, means mounting said rollers for rotary movement, a succession of means each having driving contact with a relatively small number only of the rollers of the series, means for adjusting the driving contact of said means with said rollers in accordance with load and load-conveying requirements, and means for actuating the succession of driving means along the length of the series.

17. A conveyer of the character described comprising a longitudinal series of load supporting rollers, means mounting said rollers for rotary movement, a drive belt cooperatively related to the rollers of the series, means causing and permitting said belt to progressively contact a small number only of the rollers of said series as said belt moves throughout its path of movement, and means for actuating the drive belt.

18. A conveyer of the character described comprising a longitudinal series of load supporting rollers, means mounting said rollers for rotary movement, a drive belt cooperatively related to the rollers of said series, the belt having provisions establishing driving contact with a relatively small number only of the rollers of the series, and means for actuating said belt whereby to impart a ripple of driving force to said rollers which progresses from end to end of the series.

19. A conveyer of the character described comprising a longitudinal series of load supporting rollers, means mounting said rollers for rotary movement, an endless drive belt carrying on its relatively outer face a plurality of driving pads spaced from each other and each contacting a relatively small number only of the rollers of the series, and means for actuating the belt thereby to effect a ripple drive of the rollers.

20. A conveyer of the character described comprising a longitudinal series of load supporting rollers, means mounting said rollers for rotary movement, an endless drive belt carrying on its relatively outer face a plurality of driving pads spaced from each other and each contacting a relatively small number only of the rollers of the series, means for adjusting the contact between said pads and rollers in accordance with load and/or load-conveying requirements, and means for actuating the belt thereby to effect a ripple drive of the rollers.

21. As a drive means for the rollers of a live-roll conveyer, a belt having roller contacting portions spaced at intervals along its length.

22. As a drive means for the rollers of a live-roll conveyer, a belt having roller contacting provisions secured to its relatively outer face, the provisions being disposed at spaced intervals along the length of the belt.

23. As a drive means for the rollers of a live-roll conveyer, a belt having roller contacting pads on its relatively outer face, the pads being spaced from each other along the length of the belt.

JOHN EMMET REGAN.